United States Patent [19]

Chen et al.

[11] Patent Number: 5,233,008
[45] Date of Patent: Aug. 3, 1993

[54] POLYMERIC DIOLS, POLYURETHANES AND COATED ARTICLES USEFUL AS TONER FUSING MEMBERS

[75] Inventors: Jiann H. Chen, Fairport; Tsang J. Chen; Lawrence P. DeMejo, both of Rochester, all of N.Y.

[73] Assignee: Eastman Kodak Company, Rochester, N.Y.

[21] Appl. No.: 890,503

[22] Filed: May 28, 1992

[51] Int. Cl.$^5$ ............................................ C08G 77/04
[52] U.S. Cl. ........................................ 528/33; 528/29; 428/423.1; 430/965
[58] Field of Search ............... 528/33, 29; 428/423.1; 430/965

[56] References Cited

U.S. PATENT DOCUMENTS

| | | |
|---|---|---|
| 4,075,168 | 2/1978 | Ponomarev et al. . |
| 4,272,179 | 6/1981 | Seanor . |
| 4,565,846 | 1/1986 | Saito et al. . |
| 4,722,985 | 2/1988 | Lau et al. . |
| 4,739,013 | 4/1988 | Pinchuk . |
| 4,758,491 | 7/1988 | Alexandrovich et al. . |
| 4,762,873 | 8/1988 | Miyauchi et al. .................. 524/128 |
| 4,853,737 | 8/1989 | Hartley et al. . |
| 5,019,428 | 5/1991 | Ludemann et al. . |
| 5,039,772 | 8/1991 | Davis et al. ........................ 528/29 |

*Primary Examiner*—Morton Foelak
*Assistant Examiner*—Duc Truong
*Attorney, Agent, or Firm*—Nixon, Hargrave, Devans & Doyle

[57] ABSTRACT

Toner fusing members with improved properties are formed with an outer layer comprising a melamine-cured polyurethane coating composition. Such a polyurethane is formed by polycondensation of a diisocyanate, and a polysiloxane diol containing units of 2,2-bis(4-hydroxyphenyl) hexafluoropropane.

6 Claims, No Drawings

POLYMERIC DIOLS, POLYURETHANES AND COATED ARTICLES USEFUL AS TONER FUSING MEMBERS

FIELD OF THE INVENTION

This invention relates to a polyurethane polymer and, more particularly to a melamine-cured polyurethane coating composition derived from a novel organopolysiloxane, having fluorinated diol units along the backbone. The coating composition is useful in the manufacture of toner fusing members.

BACKGROUND OF THE INVENTION

In certain electrostatographic imaging and recording processes, for instance, in electrophotographic copying processes, an electrostatic latent image formed on a photoconductive surface is developed with a thermoplastic toner powder which is thereafter fused to a substrate. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls. At least one of the rolls is heated and in the case where the fusing member is a heated roll, a smooth resilient surface is bonded either directly or indirectly to the core of the roll. Where the fusing member is in the form of a belt it is preferably a flexible endless belt having a smooth, hardened outer surface which passes around the heated roller. A persistent problem in this operation is that when the toner is heated during passage through the rolls it may tend to adhere not only to the paper but also to the fusing member which contacts it. Any toner remaining adhered to the member can cause a false offset image to appear on the next sheet that passes through the rolls and can also degrade the fusing performance of the member. Another problem may occur as a result of continued heating causing degradation of the member surface which results in an uneven surface and defective patterns in thermally fixed images.

Toner fusing rolls are composed of a cylindrical core which may contain a heat source in its interior, and a resilient covering layer formed directly or indirectly on the surface of the core. A thin layer of a suitable primer is advantageously coated on the surface of the core in order to improve bonding of the layer. Roll coverings are commonly made of fluorocarbon polymers or silicone polymers, such as poly(dimethylsiloxane) polymers, of low surface energy which minimizes adherence of toner to the roll. Frequently release oils composed of, for example, poly(dimethylsiloxanes) are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having superior resistance to heat and a smooth surface. The belt substrate can be metallic or polymeric. The surface of the belt is composed of a thinly coated, low surface energy polymer such as a fluorocarbon or a silicone resin. There is a need for coating compositions which adhere strongly to the belt and form a hard, tough surface which is resistant to wear and cracking. The surface should also be resistant to cleaning solvents and fluids.

In electrostatographic imaging processes dry developers can be used to form an image on a receiving surface such as a sheet of paper. Dry developers usually comprise a toner powder and carrier particles. Carrier particles and toner particles have different triboelectric values. As the developer mixture is agitated the particles rub together and the toner and carrier particles acquire opposite electric charges and cling together. In the subsequent development step the somewhat higher opposite charge of the electrostatic latent image draws the colored toner from the carrier and develops the image. Frequently, various addenda are used to improve the properties of the toner and carrier particles.

Toners comprise, as a major component, the binder, and as minor components a colorant and a charge control agent. The binder can be any resin which has properties suitable for dry toners. Many such resins are known but thermoplastic resins which are fixable by fusing are especially useful. When a dry toner powder image is transferred from one surface to another defects in the image can occur. It is known from U.S. Pat. No. 4,758,491 that by the addition of low surface energy liquid or solid addenda, especially polymers containing organopolysiloxane segments, many of these defects can be alleviated.

Carrier particles comprise magnetizable irregular particles which are usually coated with a film of a polymeric material which helps develop the triboelectric charge and aids the transfer of the toner. The coating material must adhere well to the carrier particle because the toner charge declines as the polymer wears off. Polymers with low surface energy properties are especially useful for coating carrier particles.

SUMMARY OF THE INVENTION

The present invention provides a novel polymeric diol and a melamine-cured polyurethane coating composition which is useful in the manufacture of fusing members with improved properties, including increased resistance to solvents and thermal degradation.

The polymeric diol of the invention is of the formula I,

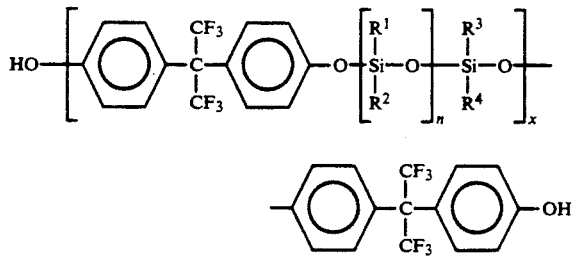

wherein
$R^1$–$R^4$ are independently $C_{1-6}$ alkyl, phenyl or vinyl;
n is 2 to 2000; and
x is 5 to 1000.

The novel diol is used to prepare the polyurethane of the invention by polycondensation with 2,2-bis(4-hydroxyphenyl)hexafluoropropane and a diisocyanate of the formula, OCN-D-NCO, wherein D is a hydrocarbon bridging group.

The coated article of the invention, such as a fusing belt, comprises a substrate and coated thereon a composition comprising a crosslinked copolymer product of a polyurethane, as described above, and a melamine resin.

DETAILED DESCRIPTION OF THE INVENTION

The polyurethanes that are used in the practice of this invention are derived from polymeric diols containing fluorine and silicone units.

These polymeric diols are readily prepared, for example, by condensing the corresponding dimethylamino-terminated polyorganosiloxanes of the formula II,

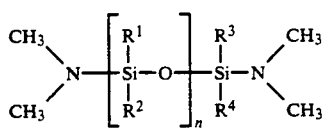

wherein $R^1$-$R^4$ and n are as described above, with a slight excess of 2,2-bis(4-hydroxyphenyl)hexafluoropropane. The condensation can be carried out in the presence of an inert solvent, for example, toluene and at a temperature of, for example, from 50°-120° C.

The starting materials for this reaction are either commercially available or may be prepared by methods well known in the literature, for example, as described by McGrath, et al., Anionic Ring Opening of Octamethylcyclotetrasiloxane In The Presence Of 1,3-Bis-(aminopropyl)-1,1,3,3-tetramethylsiloxane. ACS Symposium Series 286, page 147.

The degree of polymerization and molecular weights of the polymeric diol(I) may be varied by selecting different dimethylamino-terminated polyorganosiloxanes of the formula II and varying the reaction conditions according to conventional methods.

By adjusting the ratios of the components containing fluorine, silicon, phenyl, alkyl or vinyl groups in the condensation reaction, polymeric diols with varying degrees of solubility, surface energy and rigidity can be obtained.

In the polymeric diols of formula I:

Lower alkyl groups which $R^1$-$R^4$ represent include methyl, ethyl, propyl, isopropyl, butyl, sec. butyl, pentyl and hexyl.

Preferred polymers are those in which;

$R^1$-$R^4$ are independently methyl or phenyl, preferably methyl;

n is 4 to 400;

x is 10 to 500;

the number-average molecular weight is in the range 5,000 to 50,000.

The polymeric diols described above are condensed with the diisocyanates of formula, OCN—D—NCO, to provide the polyurethanes of the invention. The diisocyanates are commercially available or readily prepared by standard methods known in the art. The hydrocarbon bridging groups represented by D include arylene, alkylene and cycloalkylene, for example, phenylene, tolylene, hexamethylene, methylene, methylene diphenyl and methylene dicyclohexyl. Exemplary diisocyanates include, 2,4-tolylene diisocyanate, 2,6-tolylene diisocyanate, methylene diisocyanate, methylene bis(4-phenylisocyanate), 1,6-hexamethylene diisocyanate, methylene bis(4-cyclohexyl isocyanate) and mixtures of such diisocyanates.

In the compositions of the invention the solubility of the polyurethanes in polar organic solvents can be enhanced to provide compositions most suitable for solvent coating of articles. This can be achieved by enhancing the fluorine content of the polyurethane by including a major proportion of 2,2-bis(4-hydroxyphenyl)hexafluoropropane as a chain extender in the polycondensation reaction. By suitably adjusting the siloxane content of the reaction mixture polyurethanes with different levels of elasticity and surface energy can also be obtained.

The polycondensation reaction to produce the polyurethane of the invention can be carried out in an aprotic solvent, containing not more than traces of water. Suitable solvents include, for example, diethyl ether, tetrahydrofuran, dioxane, diethylene glycol dimethylether, acetone, methyl ethyl ketone, ethyl acetate, dimethylformamide, toluene, tetrachloroethylene and mixtures thereof. The reaction is carried out in one step, by mixing the reactants, that is, the polysiloxane diol, 2,2-bis(4-hydroxyphenyl)hexafluoropropane and a diisocyanate in essentially stoichiometric ratios with the solvent and a catalyst. The reaction can be carried out at a temperature of, for example, from 20°-100° C. It is desirable to use a slight excess of the diols to ensure that there are no free isocyanate groups present in the polyurethane product.

Catalysts which can be used include, tertiary amines, for example, pyridine or triethylamine; alkali hydroxides, for example sodium or potassium hydroxide; alkali alcoholates, for example, sodium methoxide; and organic tin compounds, for example, tin octanoate, tin laurate and tin acetate.

Preferred polyurethane copolymers of the invention are those wherein the polyurethane comprises 10-80 weight percent, preferably 20-50 weight percent of polymeric diols; the polyurethane has a number-average molecular weight range of 5,000 to 500,000, preferably 10,000 to 100,000; the polyurethane consists essentially of 25-50 weight percent of polydimethylsiloxane blocks; the polyurethane is derived from 2,4-tolylene diisocyanate.

The polyurethane copolymers described above are soluble in polar organic solvents, for example, chlorinated solvents such as methylene chloride, and tetrahydrofuran. They are therefore suitable for solution coating processes, especially when mixed with a crosslinking agent and subjected to curing conditions on a coated article.

The polyurethane copolymers described above contain reactive sites suitable for condensation with crosslinking agents. The reactive sites are predominantly hydroxyl groups located on the end-capping diol units, however, additional sites due to residual isocyanate groups may also be present. Crosslinking agents which can be used and which are especially useful in the preparation of surface coatings are the amino resins. The term "amino resins" is normally applied to the condensation products of formaldehyde and polyfunctional amides and amidines such as urea and melamine. The polyurethanes of the invention, comprising fluorine and silicone blocks, when cured with melamine resins provide coating compositions with properties suitable for use in fusing members.

Melamine resins, such as Cymel-303, -380, and -385, from American Cyanamid, are used as crosslinking agents, generally constituting from 2 to 80 wt. %, preferably 10 to 40 wt. % of the final coating compositions.

The commercially available melamine resins differ principally in the number of methoxymethyl and hydroxymethyl substituents on the melamine amino groups and the degree of polymerization of the resins. The methoxymethyl and hydroxymethyl groups are both capable of acid catalyzed crosslinking with suitable nucleophiles, such as the hydroxyl terminal groups of the polyurethanes of the invention. Cymel-303 melamine resin, with a degree of polymerization of about 1.7, is composed predominantly of monomeric hexamethoxymethyl melamine and crosslinks with hydroxyl groups in the presence of a strong acid catalyst. Cymel-380 melamine resin, with a degree of polymerization of about 2.6 contains both hydroxymethyl and methoxymethyl groups and a significant level of polymeric forms, reacts readily with hydroxyl groups in the presence of weak acid catalysts. Cymel-385 melamine resin, with a degree of polymerization of about 2.1, and a high proportion of hydroxymethyl groups is a very reactive curing agent under mild acidic conditions. By degree of polymerization is meant, the average number of triazine units per molecule.

In accordance with the present invention, the coated article can be a fusing member in the form of a roll, belt or any surface having a suitable configuration for fixing or fusing a thermoplastic toner image to a substrate such as a paper sheet.

When the fusing member is in the form of a belt which passes around a heated resilient or hard roller the belt comprises a substrate having a thin, hard outer coating. The backup pressure roller has an overcoat which is sufficiently compliant that, in combination with the coated belt, a compliant surface is presented to an image carrying receiver sheet.

A coated fusing belt of the invention comprises a continuous flexible substrate having a surface covering of a melamine-cured polyurethane of the invention. The coated fusing belt is fabricated by first preparing a solution to be used to form the coating. The solution comprises a solvent, for example, tetrahydrofuran, the polyurethane of choice, a melamine resin and a catalyst useful for crosslinking of the diol terminated polyurethane with the melamine resin's reactive groups. The solution contains, for example, 10–30 weight percent of the polyurethane and 2–10 weight percent of the melamine resin. The coating solution is applied to the belt substrate by well known techniques such as blade application or ring coating to give a 2–20 micron thick layer. Curing is accomplished in about 30 min. to 3 hrs., at temperatures from about 100° to 250° C., using an acid catalyst, such as trifluoroacetic acid, at about 0.001% to 1.0% with respect to total solids in the formulations. In a preferred embodiment curing is accomplished by heating at about 110°–130° C. for one hour.

The polyurethanes of the invention have the advantage that they are readily soluble in polar solvents used in solution coating techniques which allows thin surface coatings to be formed on fusing members. The melamine-cured, thermoset resins of the invention provide hard, tough, low surface energy coatings for such fusing members and have the advantages of excellent thermal stability, good releasing properties, resistance to cleaning solvents and swelling by release oils, and resistance to abrasion and delamination. Fusing members can be coated with a thin, hardened surface which resists wear and cracking and resists the tendency of toner to become embedded on the surface. Their superior resistance to swelling by release oils results in a reduction or elimination of step patterns in electrophotographic copies.

The polyurethane copolymers and coating compositions of the invention having the properties described above can also be advantageously used as low surface energy addenda for toners and toner carrier particles.

Cured coatings of the invention, on stainless steel shims or copper foils at dry thickness of about 0.5 micron to 50 microns, have exhibited good adhesion to the substrates with excellent resistance against common organic solvents, such as acetone and toluene. In addition, when evaluated as image-fixing media, the coatings have shown desirable release properties with low or no off-settings under simulated fusing conditions, as indicated in examples hereinafter.

EXAMPLES

The following examples illustrate the preparations of polymeric diols and polyurethanes, as well as coating, curing and testing of metal strips under simulated image-fixing conditions.

Preparation of Polymeric Diols, Endcapped with 2,2-Bis(4-hydroxyphenyl)hexafluoropropane

EXAMPLE 1

2,2-Bis(4-hydroxyphenyl)hexafluoropropane (37.5 g) was dissolved in toluene (75 ml) under a nitrogen atmosphere by heating to 110° C. A polydimethylsiloxane (PDMS) endcapped with dimethyl (dimethylamino)silyl groups [obtainable from Hüls America Inc., Piscataway, N.J. as PS383] (48 g), and having a molecular weight of about 500 and a PDMS block length of about 5, was added dropwise to the stirred solution during about 90 min.

An additional 12 g of the amino-PDMS were added and heating and stirring were continued overnight. The reaction mixture was cooled to 60° C. and concentrated under vacuum to remove residual dimethylamine and toluene and provide the polymeric diol, yield=-80–90%.

By following essentially the same procedure as described for Example 1 and substituting the polydimethylsiloxane endcapped with dimethyl(dimethylamino)silyl groups (MW 500, PDMS block length 5) with equivalent reagents having different PDMS block lengths the following polymeric diols were obtained:

| Example | PDMS Block Length | Molecular Weight of Diols | |
|---|---|---|---|
| | | $Mn \times 10^{-3}$ | $Mw \times 10^{-3}$ |
| 2 | 400 | 13.2 | 109.0 |
| 3 | 6,000 | 107.0 | 211.0 |
| 4 | 20,800 | 18.7 | 38.8 |

Preparation of Polyurethanes From Polymeric Diols

EXAMPLE 5

The polymeric diol (15 g) as obtained from Example 1,2,2-bis(4-hydroxyphenyl)hexafluoropropane (27.6 g), dimethylformamide (40 g) and tin octanoate (0.5 g) were mixed, stirred under nitrogen then heated to 80° C. 2,4-Tolylene diisocyanate (17.5 g) was added dropwise to the reaction mixture during 2 hrs. After cooling to ambient temperature, the polyurethane polymer was isolated from a large excess of water and dried in a vacuum oven overnight. The resulting polyurethane contained about 25% by weight of the fluoro-silicone diol as the soft segment. Yield=95%.

By following essentially the same procedure as described for Example 5 and substituting the polymeric diol of Example 1 with the polymeric diols of Examples 2-4 the following polyurethanes were obtained:

| Example | Polymeric Diol | Weight % PDMS Blocks |
| --- | --- | --- |
| 6 | from Example 4 | 50 |
| 7 | from Example 3 | 50 |
| 8 | from Example 2 | 30 |
| 9 | from Example 2 | 40 |
| 10 | from Example 2 | 50 |

EXAMPLE 11

Preparation of Intermediate Polydimethylsiloxanes Endcapped with Dimethyl(dimethylamino)silyl Groups A 1 liter three-neck round bottom flask was charged with 200 g of octamethylcyclotetrasiloxane and 2.2 g of tetramethylammonium siloxanolate (1.5-2 mole % nitrogen). The mixture was stirred and heated to 95° C. After 30 mins. 7.32 g of the PDMS endcapped with dimethyl(dimethylamino)silyl groups as described in Ex. 1 was added to the viscous solution and stirred at 95° C. overnight. The temperature was then raised to 150° C. for 1 hour to deactivate the catalyst, then unreacted cyclics were removed by vacuum distillation at 170° C. The residual material contained the desired polydimethylsiloxane endcapped with dimethyl(dimethylamino)silyl groups.

EXAMPLE 12

Fusing Release Evaluation of Coating from Example 5 Polymer on Stainless Steel Shims The coating strips were mounted on a test roller, and were tested under simulated fusing conditions to evaluate the release properties. A branched polyester color image on laser print paper released from the Example 5 coating while an uncoated stainless steel strip failed to release under the following fusing conditions:

Fusing Temperature: 280° F. (approx. 138° C.)
Release Temperature: 170° F. (approx. 76° C.)
Speed: one inch per sec. (approx. 2.5 cm per sec)
Pressure Roll: Silicone Elastomer (Silastic J. supplied by Dow Corning Corp.)

Although the invention has been described in detail with particular reference to certain preferred embodiments thereof, it should be appreciated that variations and modifications can be effected within the spirit and scope of the invention.

What is claimed is:

1. A polymeric diol of the formula I,

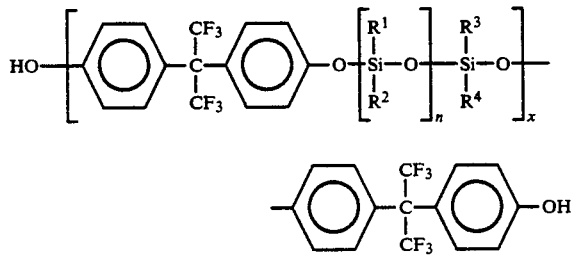

wherein,
$R^1$-$R^4$ are independently $C_{1-6}$ alkyl, phenyl or vinyl;
n is 2 to 2000; and
x is 5 to 1000.

2. A diol according to claim 1, wherein $R^1$-$R^4$ are independently methyl or phenyl.

3. A diol according to claim 2, wherein $R^1$-$R^4$ are methyl.

4. A diol according to claim 1, wherein n is 4 to 400.

5. A diol according to claim 1, wherein x is 10 to 500.

6. A diol according to claim 1, having a number-average molecular weight in the range of 5,000 to 50,000.

* * * * *